United States Patent
Sugo

(10) Patent No.: US 11,813,944 B2
(45) Date of Patent: Nov. 14, 2023

(54) ELECTRIFIED TRACTOR AND COMPUTER-READABLE MEDIUM

(71) Applicant: TOYOTA JIDOSHA KABUSHIKI KAISHA, Aichi-ken (JP)

(72) Inventor: Yuki Sugo, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/715,039

(22) Filed: Apr. 7, 2022

(65) Prior Publication Data

US 2022/0348089 A1 Nov. 3, 2022

(30) Foreign Application Priority Data

Apr. 30, 2021 (JP) ................................ 2021-077739

(51) Int. Cl.

| | | |
|---|---|---|
| B60L 15/20 | (2006.01) | |
| B60L 58/12 | (2019.01) | |
| B60K 17/28 | (2006.01) | |
| B62D 49/06 | (2006.01) | |
| B60C 27/02 | (2006.01) | |

(52) U.S. Cl.
CPC .............. B60L 15/20 (2013.01); B60C 27/02 (2013.01); B60K 17/28 (2013.01); B62D 49/0692 (2013.01); B60L 2200/40 (2013.01); B60L 2210/40 (2013.01)

(58) Field of Classification Search
CPC .. B60L 15/20; B60L 2200/40; B60L 2210/40; B60L 58/25; B60L 58/13; B60L 2240/545; B60K 17/28; B60K 1/00; B60K 1/02; B60K 1/04; B60Y 2200/221; B60W 2300/152; B60W 50/0097
See application file for complete search history.

(56) References Cited

U.S. PATENT DOCUMENTS

| | | | | |
|---|---|---|---|---|
| 5,995,895 | A * | 11/1999 | Watt ................. | B60K 31/0066 56/10.2 G |
| 2018/0236883 | A1* | 8/2018 | Kokubo ............ | H01M 16/006 |
| 2021/0316713 | A1* | 10/2021 | Vilar ................. | B60L 1/20 |
| 2021/0394622 | A1* | 12/2021 | Gaither ............. | B60L 15/2009 |
| 2022/0319248 | A1* | 10/2022 | Sugo ................. | G07C 5/02 |
| 2022/0338404 | A1* | 10/2022 | Tanaka .............. | A01B 63/12 |

FOREIGN PATENT DOCUMENTS

JP 2014-143965 A 8/2014

* cited by examiner

*Primary Examiner* — Tisha D Lewis
(74) *Attorney, Agent, or Firm* — HAUPTMAN HAM, LLP

(57) ABSTRACT

An electrified tractor includes a vehicle body, an electric motor, a battery, an inverter configured to control input-output electric power of the battery, a wheel for traveling, and a control device. On condition that the electrified tractor travels inside a restriction area determined in advance as one condition, the control device controls the inverter such that the input-output electric power of the battery falls within a specific electric power range determined in advance. The control device determines whether or not there is a possibility that the electrified tractor moves from the restriction area to outside the restriction area. In a case where an affirmative determination is made in a determination process during a restriction process, the control device expands the specific electric power range as compared with a case where a negative determination is made in the determination process.

8 Claims, 5 Drawing Sheets

ELECTRIFIED TRACTOR AND COMPUTER-READABLE MEDIUM

CROSS-REFERENCE TO RELATED APPLICATION

This application claims priority to Japanese Patent Application No. 2021-077739 filed on Apr. 30, 2021, incorporated herein by reference in its entirety.

BACKGROUND

1. Technical Field

The present disclosure relates to an electrified tractor and a computer-readable medium.

2. Description of Related Art

A tractor described in Japanese Unexamined Patent Application Publication No. 2014-143965 (JP 2014-143965 A) includes a battery, an electric motor, wheels, and a work machine. The battery supplies electric power to the electric motor. The electric motor is driven upon receipt of electric power from the battery. Driving force from the electric motor is transmitted to the wheels and the work machine. That is, the tractor described in JP 2014-143965 A travels with the electric motor being used as a drive source.

SUMMARY

As a technology for the tractor as described in JP 2014-143965 A, there has been known a technology to restrict input-output electric power of the battery within a given range in a case where the travel state of the tractor is brought into a specific state or in a case where the charging state of the battery is brought into a specific state, for example. In the meantime, at the time when the tractor escapes from mud or at the time when the tractor escapes from a farm field to a road, a torque larger than usual is requested as an output torque of the electric motor. Accordingly, when the tractor tries to escape from the mud, the farm field, or the like under the situation where input-output electric power of the battery is restricted as described above, the output torque of the electric motor might become insufficient, and the tractor might not be able to escape from the mud, the farm field, or the like.

In order to solve the above problem, the present disclosure is to provide an electrified tractor. The electrified tractor includes a vehicle body, an electric motor, a battery, an inverter, a wheel for traveling, and a control device. The vehicle body is connectable to a work machine. In the battery, electric power to be supplied to the electric motor is stored. The inverter is configured to control input-output electric power of the battery. The wheel is configured to rotate by a driving force from the electric motor. The control device is configured to control the inverter as a target to be controlled. The control device executes the following processes: a restriction process of, on condition that the electrified tractor travels inside a restriction area determined in advance as one condition, controlling the inverter such that the input-output electric power of the battery falls within a specific electric power range determined in advance; a determination process of determining whether or not there is a possibility that the electrified tractor moves from the restriction area to outside the restriction area; and a relaxation process of, in a case where an affirmative determination is made in the determination process during the restriction process, expanding the specific electric power range as compared with a case where a negative determination is made in the determination process.

Further, in order to solve the above problem, the present disclosure is to provide a computer-readable medium storing a control program applied to a control device of an electrified tractor. The electrified tractor includes a vehicle body, an electric motor, a battery, an inverter, a wheel for traveling, and the control device. The vehicle body is connectable to a work machine. In the battery, electric power to be supplied to the electric motor is stored. The inverter is configured to control input-output electric power of the battery. The wheel is configured to rotate by a driving force from the electric motor. The control device is configured to control the inverter as a target to be controlled. The control program causes the control device to execute the following processes: a restriction process of, on condition that the electrified tractor travels inside a restriction area determined in advance as one condition, controlling the inverter such that the input-output electric power of the battery falls within a specific electric power range determined in advance; a determination process of determining whether or not there is a possibility that the electrified tractor moves from the restriction area to outside the restriction area; and a relaxation process of, in a case where an affirmative determination is made in the determination process during the restriction process, expanding the specific electric power range as compared with a case where a negative determination is made in the determination process.

In the above configuration, in a case where there is a possibility that the electrified tractor moves to outside the restriction area even during the restriction process, restriction on input-output electric power of the battery is relaxed. As a result, the electric motor can output a large torque as compared with a case where the relaxation process is not executed, so that the electrified tractor is more likely to escape from the restriction area.

In the above configuration, the electrified tractor may be configured such that, in a case where the number of times the affirmative determination is made in the determination process exceeds a specific number of times determined in advance after the restriction process is started but before the restriction process is ended, the control device prohibits execution of the relaxation process. With the above configuration, it is possible to restrain a state of charge of the battery from decreasing excessively or an excessive burden from being imposed on the battery due to repetition of the relaxation process.

In the above configuration, the electrified tractor may be configured such that: a farm field map is stored in the control device, the farm field map being a map in which a farm field is divided into a plurality of divisional sections, and a position of each of the divisional sections is associated with skid information indicative of whether the wheel skids or not in the each of the divisional sections; and the restriction area is a divisional section associated with information indicating that the wheel skids on the farm field map.

In the above configuration, in a part where the wheel skids, that is, at the time when the electrified tractor escapes from mud, restriction on the input-output electric power of the battery is relaxed. Accordingly, at the time when the electrified tractor escapes from mud where the electrified tractor requires a relatively large torque as an output torque from the electric motor, it is possible to restrain the output torque of the electric motor from becoming insufficient.

In the above configuration, the electrified tractor may further include a switch configured to be switched between ON and OFF by an occupant of the electrified tractor. In the determination process, in a case where the switch is turned on, the control device may determine that there is a possibility that the electrified tractor moves from the restriction area to outside the restriction area. With the above configuration, it is possible to determine that the electrified tractor tries to escape from the restriction area, based on an ON-OFF operation on the switch by the occupant.

In the above configuration, the electrified tractor may be configured such that, in the determination process, in a case where a state where the wheel is skidding continues for a specific period of time determined in advance, the control device determines that there is a possibility that the electrified tractor moves from the restriction area to outside the restriction area. With the above configuration, it is possible to accurately determine that the electrified tractor tries to escape from mud or the like, based on the skid of the wheel.

In the above configuration, the electrified tractor may be configured such that the control device executes the restriction process further on condition that a state of charge of the battery is equal to or less than a first specific state of charge determined in advance. With the above configuration, it is possible to restrict input and output of electric power of the battery along with a decrease in the state of charge of the battery. Accordingly, it is possible to restrain the battery from overdischarging.

In the above configuration, the electrified tractor may further include an inclination sensor configured to detect an inclination of the vehicle body. The restriction area may be a farm field. In the determination process, the control device may determine, based on a detection result from the inclination sensor, whether or not there is a possibility that the electrified tractor moves from the restriction area to outside the restriction area. With the above configuration, it is possible to accurately determine, based on the inclination sensor, that the electrified tractor tries to escape from the farm field to the road or the like by traveling on the slope.

In the above configuration, the electrified tractor may further include a system main relay placed between the battery and the inverter, the system main relay being configured to switch electrical conduction between ON and OFF. In a case where a state of charge of the battery is equal to or less than a second specific state of charge determined in advance after the relaxation process is executed, the control device may execute a reset process and a recalculation process after the reset process, the reset process being a process of turning off the system main relay, the recalculation process being a process of recalculating the state of charge of the battery in a state where the system main relay is turned off. In a case where the state of charge of the battery recalculated in the recalculation process is larger than the second specific state of charge, the control device may turn on the system main relay.

With the above configuration, after the relaxation process, the battery is electrically separated from the inverter, so that an open circuit voltage of the battery is stable. Since the state of charge of the battery is recalculated in this state, even when detection values of a voltage and a current of the battery are unstable along with the relaxation process, the state of charge can be accurately recalculated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Overall Configuration of Electrified Tractor

Figure 1:
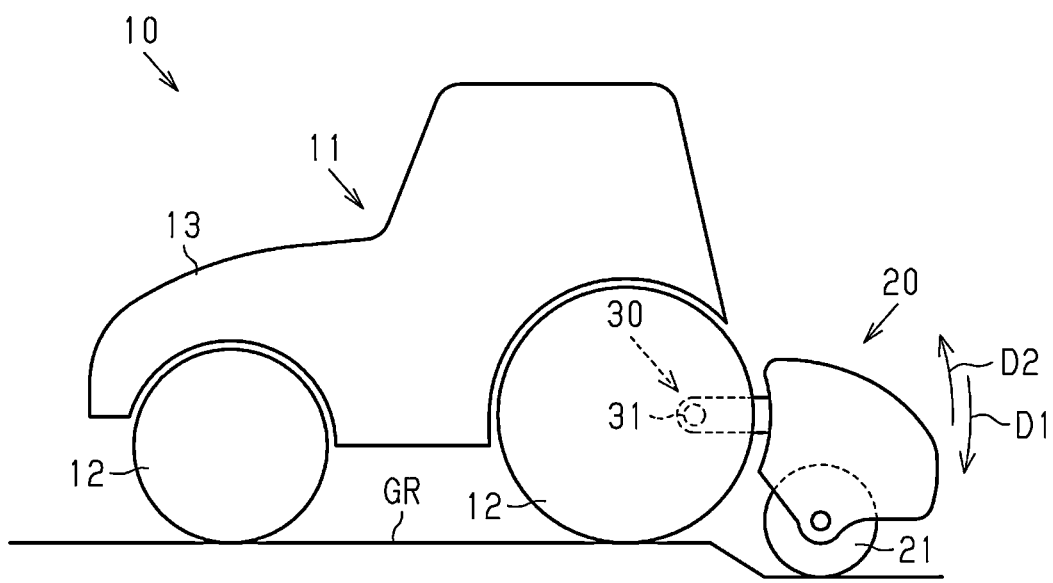
FIG. 1 is a schematic configuration diagram of an electrified tractor.

As illustrated in FIG. 1, an electrified tractor 10 includes a vehicle 11, a work machine 20, and a support mechanism 30. The vehicle 11 includes a plurality of wheels 12 and a vehicle body 13. The wheels 12 are connected to the vehicle body 13. The vehicle body 13 can be connected to the work machine 20 via the support mechanism 30.

The work machine 20 is placed behind the vehicle 11. The work machine 20 includes a plurality of blades 21 for cultivation. The work machine 20 can cultivate a farm field by rotating the blades 21 in a state where the blades 21 make contact with a ground GR of the farm field. Note that, in FIG. 1, the blades 21 are simplified and illustrated in a cylindrical shape.

The support mechanism 30 connects the vehicle body 13 to the work machine 20. The support mechanism 30 includes a support shaft 31. Although not illustrated herein, the support mechanism 30 includes a plurality of rods, a hydraulic circuit, a control valve, a hydraulic cylinder, and so on in addition to the support shaft 31. When the control valve or the like is opened or closed in the support mechanism 30, the hydraulic cylinder operates. Hereby, the work machine 20 rotates around the support shaft 31. More specifically, the work machine 20 rotates the blades 21 around the support shaft 31 in an approach direction D1 or in a separation direction D2. The approach direction D1 is a direction in which the blades 21 approach the ground GR. The separation direction D2 is a direction in which the blades 21 are distanced from the ground GR.

Power Transmission Path in Electrified Tractor

Figure 2:
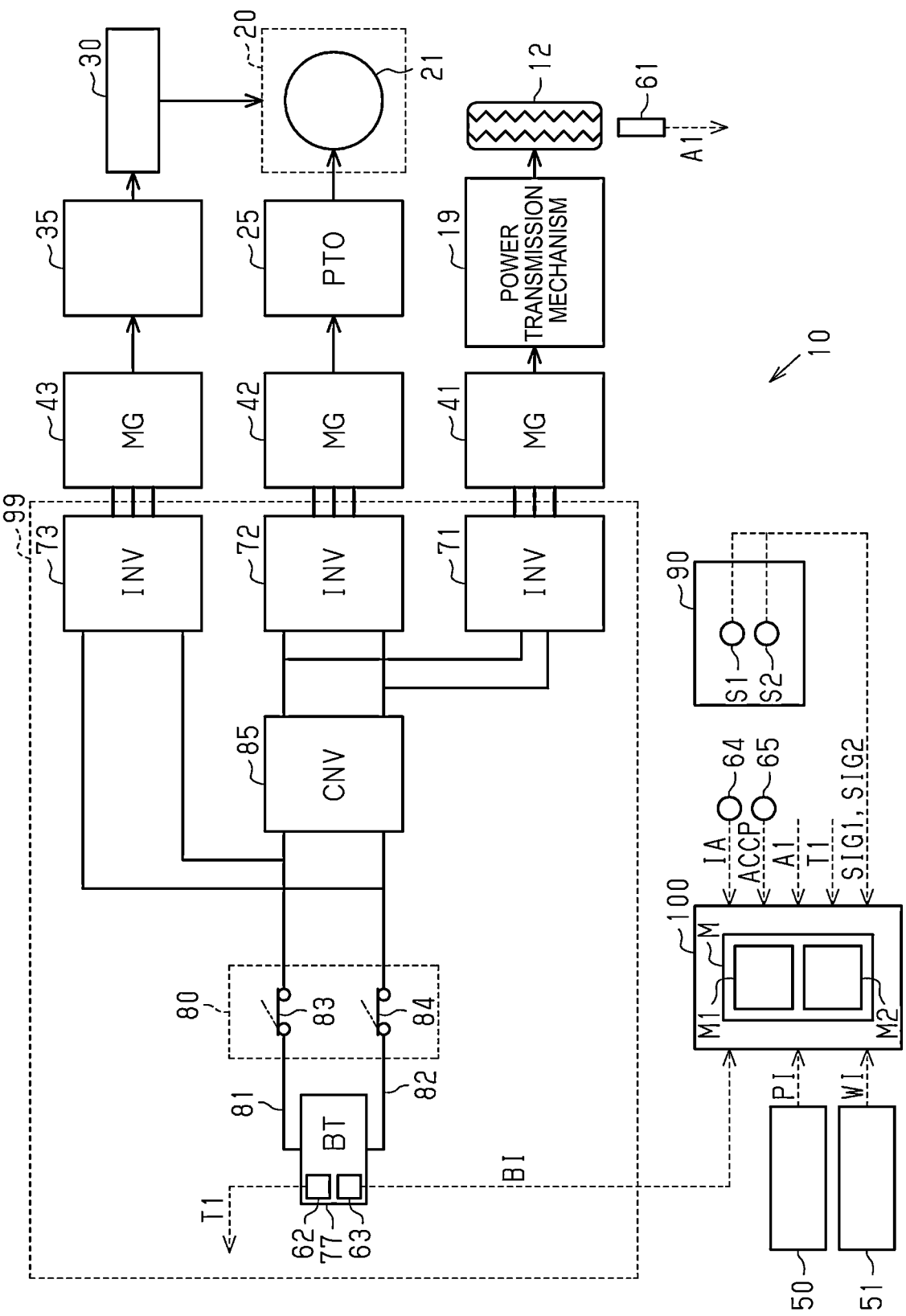
FIG. 2 is a view illustrating an electrical configuration of the electrified tractor and a power transmission path in the electrified tractor.

As illustrated in FIG. 2, the electrified tractor 10 includes a first electric motor 41, a second electric motor 42, a third electric motor 43, a power transmission mechanism 19, a PTO 25, and a hydraulic fixture 35. The first electric motor 41, the second electric motor 42, and the third electric motor 43 are generator motors. Note that "PTO" represents "power take-off."

The first electric motor 41 is a drive source configured to move the electrified tractor 10. The first electric motor 41 is connected to the wheels 12 via the power transmission mechanism 19. That is, the wheels 12 are wheels for traveling that are configured to rotate by a driving force from the first electric motor 41. The power transmission mechanism 19 includes a deceleration mechanism configured to amplify and output a torque, and so on, for example.

The second electric motor 42 is a drive source for the work machine 20. The second electric motor 42 is connected to the blades 21 of the work machine 20 via the PTO 25. The PTO 25 is a device configured to transmit a torque of the second electric motor 42 to the blades 21. The PTO 25 includes a deceleration mechanism and so on, for example.

The third electric motor 43 is a drive source for the hydraulic fixture 35. The third electric motor 43 drives the hydraulic fixture 35. The hydraulic fixture 35 generates hydraulic pressure based on a driving force from the third electric motor 43. The hydraulic pressure generated by the hydraulic fixture 35 is supplied to the support mechanism 30. As described above, the support mechanism 30 can rotate the work machine 20 in the approach direction D1 and in the separation direction D2 based on the hydraulic pressure thus supplied.

Note that, as described above, the first electric motor 41 is a generator motor. Accordingly, the first electric motor 41 can be functionalized as a generator. More specifically, at the time when the electrified tractor 10 decelerates, the first electric motor 41 can be functionalized as a generator. On this occasion, a regenerative braking force corresponding to the power generation amount of the first electric motor 41 is generated in the electrified tractor 10.

Electrical Configuration of Electrified Tractor

As illustrated in FIG. 2, the electrified tractor 10 includes a power supply circuit 99. The power supply circuit 99 includes a battery 77, a positive electrode line 81, a negative electrode line 82, and a system main relay 80. Further, the power supply circuit 99 includes a converter 85, a first inverter 71, a second inverter 72, and a third inverter 73.

The battery 77 is a secondary battery. The battery 77 is a high-voltage battery configured to move the electrified tractor 10, drive the work machine 20, and drive the support mechanism 30. In the battery 77, electric power to be supplied to the first electric motor 41, the second electric motor 42, and the third electric motor 43 is stored.

A high-potential-side terminal of the battery 77 is connected to the converter 85 via the positive electrode line 81. Further, a low-potential-side terminal of the battery 77 is connected to the converter 85 via the negative electrode line 82. The converter 85 outputs a current by converting the magnitude of a voltage.

The system main relay 80 includes a positive electrode relay 83 and a negative electrode relay 84. The positive electrode relay 83 is placed in the middle of the positive electrode line 81. The negative electrode relay 84 is placed in the middle of the negative electrode line 82. The system main relay 80 turns on and off electrical connection between the battery 77 and the converter 85.

The first inverter 71 and the second inverter 72 are connected to the converter 85. The first inverter 71 and the second inverter 72 are parallel to each other. The first inverter 71 is connected to the first electric motor 41. The first inverter 71 performs power conversion from direct current to alternating current between the converter 85 and the first electric motor 41. The second inverter 72 is connected to the second electric motor 42. The second inverter 72 performs power conversion from direct current to alternating current between the converter 85 and the second electric motor 42.

The third inverter 73 is connected to the battery 77. The third inverter 73 is parallel to the converter 85. The third inverter 73 is connected to the third electric motor 43. The third inverter 73 performs power conversion from direct current to alternating current between the battery 77 and the third electric motor 43.

The electrified tractor 10 includes a rotation sensor 61, a battery temperature sensor 62, a current-voltage sensor 63, an acceleration sensor 64, and an accelerator pedal sensor 65. The rotation sensor 61 is placed in the vicinity of the rotating shaft of its corresponding wheel 12. The rotation sensor 61 detects a rotation speed A1 of the corresponding wheel 12.

The battery temperature sensor 62 is provided inside the battery 77. The battery temperature sensor 62 detects a temperature T1 of the battery 77. The current-voltage sensor 63 detects a voltage of the battery 77 and a current from the battery 77 as batter information BI.

The acceleration sensor 64 is placed inside the vehicle body 13 of the electrified tractor 10. The acceleration sensor 64 detects an acceleration IA generated inside the vehicle body 13. The acceleration IA is a vector value and includes information on direction. Note that the acceleration of gravity is applied to the electrified tractor 10. Accordingly, the acceleration sensor 64 also functions as an inclination sensor configured to detect the inclination of the vehicle body 13. The accelerator pedal sensor 65 detects an operation amount ACCP of an accelerator pedal to be operated by an occupant of the electrified tractor 10.

Schematic Configuration of Control Device and so on

The electrified tractor 10 includes a control device 100, an operating portion 90, a GPS device 50, and a wireless communicator 51.

The operating portion 90 is attached to the vehicle body 13. More specifically, the operating portion 90 is attached to the vehicle body 13 at a position where the operating portion 90 is operable by the occupant of the electrified tractor 10. The operating portion 90 includes a map switch S1 and an escape control switch S2.

The map switch S1 can be switched between ON and OFF by the occupant of the electrified tractor 10. The map switch S1 is a switch by which a farm field map creating control (described later) is started or ended. The map switch S1 is turned on when the electrified tractor 10 performs cultivation in a farm field, for example. When the map switch S1 is turned on, the map switch S1 outputs a first signal SIG1.

The escape control switch S2 can be switched between ON and OFF by the occupant of the electrified tractor 10. The escape control switch S2 is a switch by which a skid escape control (described later) is started or ended. The escape control switch S2 is turned on when the electrified tractor 10 enters the farm field from outside the farm field, for example. When the escape control switch S2 is turned on, the escape control switch S2 outputs a second signal SIG2.

The GPS device 50 receives a signal indicative of present position information PI on the electrified tractor 10 from a GPS satellite.

The wireless communicator 51 is communicable with a weather server (not illustrated) via a radio communication network. The wireless communicator 51 receives weather information WI corresponding to a present position specified by the position information PI. The weather information WI includes information on whether it is raining or not.

The control device 100 controls the first inverter 71, the second inverter 72, the third inverter 73, and so on as targets to be controlled. The control device 100 controls the first inverter 71 such that the electrified tractor 10 travels or the electrified tractor 10 stops traveling. Further, the control device 100 controls the second inverter 72 such that the work machine 20 operates or stops operating. That is, the control device 100 controls input-output electric power of the battery 77 through the controls on the first inverter 71 and the second inverter 72.

Further, the control device 100 controls the system main relay 80 as a target to be controlled. That is, the control device 100 switches electrical connection achieved by the positive electrode relay 83 and the negative electrode relay 84 between ON and OFF. Note that, when the electrical connection achieved by the positive electrode relay 83 and the negative electrode relay 84 is turned on, the battery 77 is brought into an energized state. That is, the battery 77 supplies electric power to devices connected to the battery 77. In the meantime, when the electrical connection achieved by the positive electrode relay 83 and the negative electrode relay 84 is turned off, the battery 77 is brought into a non-energized state. Note that the control device 100 operates upon receipt of electric power from a low-voltage battery (not illustrated) that is different from the battery 77.

The control device 100 acquires a signal indicative of the rotation speed A1 of the wheel 12 from the rotation sensor 61. The control device 100 acquires a signal indicative of the temperature T1 of the battery 77 from the battery temperature sensor 62. The control device 100 acquires a signal indicative of the battery information BI from the current-voltage sensor 63. Note that, as described above, the battery information BI includes information on the voltage of the battery 77 and the current from the battery 77. The control device 100 acquires a signal indicative of the acceleration IA of the vehicle body 13 from the acceleration sensor 64. The control device 100 acquires a signal indicative of the operation amount ACCP of the accelerator pedal from the accelerator pedal sensor 65. The control device 100 receives a signal related to the position information PI via the GPS device 50. Note that the control device 100 acquires the signals from these sensors repeatedly at every unit time.

The control device 100 requests weather information WI at a present position to the weather server (not illustrated) via the wireless communicator 51. The control device 100 receives the weather information WI transmitted in response to the request via the wireless communicator 51.

In the control device 100, a farm field map M in which skid information is written is stored. The skid information indicates whether or not the wheel 12 skids in a farm field to be cultivated. The farm field map M is a virtual map representing the farm field in a two-dimensional manner. Further, on the farm field map M, the farm field is divided into a plurality of divisional sections in a matrix manner. Each divisional section is associated with information on the position of the each divisional section. Further, each divisional section is associated with skid information indicating whether the wheel 12 skids or not. In the farm field map M, when a skid flag is turned on, the skid flag indicates that the wheel 12 skids. Further, in the farm field map M, when the skid flag is turned off, the skid flag indicates that the wheel 12 does not skid. In the control device 100, a first farm field map M1 to be used in a case where it is not raining and a second farm field map M2 to be used in a case where it is raining are stored as the farm field map M. In the first farm field map M1 and the second farm field map M2, their divisional sections are set to the same positions. Note that, in an initial state where the electrified tractor 10 is shipped from a factory or the like, the skid flags of all divisional sections on the farm field map M are turned off.

The control device 100 can be provided as one or more processors configured to execute various processes in accordance with a computer program (software). Note that the control device 100 may be configured as one or more exclusive hardware circuits such as an application specific integrated circuit (ASIC) configured to execute at least one of various processes or a circuitry including a combination of the exclusive hardware circuits. The processor includes a CPU and a memory such as a RAM or a ROM. A program code or a command configured to cause the CPU to execute a process is stored in the memory. The memory, that is, a computer-readable medium includes all available media accessible by a general-purpose or exclusive computer. The control device 100 includes a storage device as an electrically rewritable nonvolatile memory. The control device 100 stores, in the storage device that is a nonvolatile memory, a program configured to cause the control device 100 to execute a farm field map creating control, a skid escape control, and a farm field escape control (described later).

Outline of Control for Escape from Skid State

The control device 100 executes the farm field map creating control and the skid escape control as controls for escape from the skid state. By executing the farm field map creating control, the control device 100 updates the farm field map M in which skid information on the farm field to be cultivated by the electrified tractor 10 is stored. By executing the skid escape control, the control device 100 executes a restriction process, a determination process, and a relaxation process.

Farm Field Map Creating Control

The farm field map creating control is started on condition that the map switch S1 is turned on by the occupant of the electrified tractor 10. That is, the control device 100 executes the farm field map creating control on condition that the control device 100 acquires a first signal SIG1 from the map switch S1. Further, the farm field map creating control is ended on condition that the map switch S1 is turned off by the occupant of the electrified tractor 10. That is, the control device 100 ends the farm field map creating control on condition that the control device 100 does not acquire the first signal SIG1 from the map switch S1.

Figure 3:
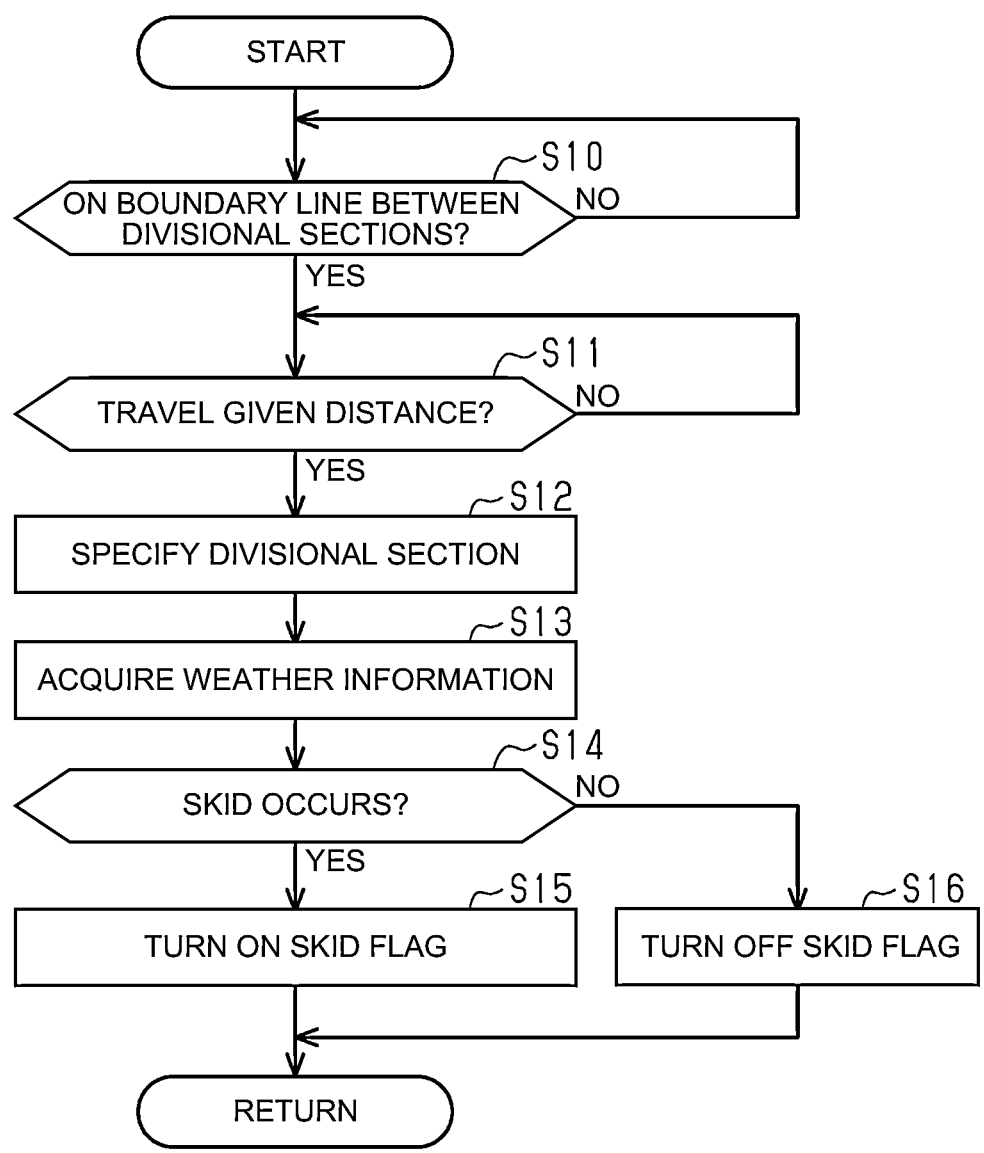
FIG. 3 is a flowchart of a farm field map creating control to be executed by a control device of an electrified tractor according to a first embodiment.

As illustrated in FIG. 3, when the farm field map creating control is started, the control device 100 first executes the process of step S10. In step S10, the control device 100 determines whether or not the position of the electrified tractor 10 is placed on a boundary between adjacent divisional sections on the farm field map M. More specifically, the control device 100 acquires position information PI from the GPS device 50. Then, the control device 100 determines whether a present position indicated by the position information PI is placed on the boundary between the adjacent divisional sections. At this time, in a case where the present position is within a given allowable distance from the boundary between the divisional sections, the control device 100 determines that the present position is placed on the boundary. The allowable distance at this time is around dozens of centimeters, for example. In a case where a negative determination is made in step S10 (S10: NO), the control device 100 executes the process of step S10 again. That is, until the electrified tractor 10 is placed on a boundary line between divisional sections, the control device 100 repeats the process of step S10. In a case where an affirmative determination is made in step S10 (S10: YES), the process of the control device 100 shifts to step S11.

In step S11, the control device 100 determines whether or not the electrified tractor 10 has traveled a given distance determined in advance. More specifically, the control device 100 calculates a travel distance of the electrified tractor 10 after step S10 is started, based on a rotation speed A1 of the wheel 12 that is detected by the rotation sensor 61, an acceleration IA detected by the acceleration sensor 64, position information PI acquired from the GPS device 50, and so on. The control device 100 determines whether or not the calculated travel distance is larger than the given distance determined in advance. Note that the given distance is determined as a distance corresponding to one divisional section out of the divisional sections obtained by dividing the farm field. One example of the given distance is several meters, for example.

In a case where a negative determination is made in step S11 (S11: NO), the control device 100 executes the process of step S11 again. That is, the control device 100 repeats the process of step S11 until the electrified tractor 10 travels the given distance. In a case where an affirmative determination is made in step S11 (S11: YES), the process of the control device 100 shifts to step S12.

In step S12, the control device 100 specifies which divisional section on the farm field map M corresponds to a part where the electrified tractor 10 has traveled. More specifically, the control device 100 acquires present position information PI from the GPS device 50. Further, the control device 100 acquires position information PI at the time when step S10 is executed. The control device 100 then specifies which divisional section on the farm field map M corresponds to a travel locus of the electrified tractor 10 while the control device 100 is repeatedly executing step S11, based on these pieces of position information PI. After that, the process of the control device 100 shifts to step S13.

In step S13, the control device 100 requests weather information WI corresponding to the present position of the electrified tractor 10 to the weather server via the wireless communicator 51. Then, the control device 100 receives the weather information WI via the wireless communicator 51. The control device 100 determines whether it is raining or not, based on the received weather information WI. After that, the process of the control device 100 shifts to step S14.

In step S14, the control device 100 determines whether or not a state where the electrified tractor 10 is skidding continues for a specific period of time determined in advance until an affirmative determination is made in step S11, that is, while the electrified tractor 10 is traveling the given distance. More specifically, the control device 100 acquires a rotation speed A1 detected by the rotation sensor 61 while the electrified tractor 10 is traveling the given distance. Then, the control device 100 calculates transition of the traveling speed of the electrified tractor 10 based on the rotation speed A1 of the wheels 12. Meanwhile, the control device 100 acquires position information PI detected by the GPS device 50 while the electrified tractor 10 is traveling the given distance. The control device 100 calculates transition of the travel distance of the electrified tractor 10 per unit time, that is, transition of the traveling speed, from changes in the position information PI. The control device 100 compares the transition of the traveling speed that is calculated based on the rotation sensor 61 with the transition of the traveling speed that is calculated based on the GPS device 50. Then, the control device 100 determines whether or not a state where the traveling speed calculated based on the rotation sensor 61 is larger than the traveling speed calculated based on the GPS device 50 continues for a specific period of time determined in advance or more. In a case where an affirmative determination is made, the control device 100 determines that the electrified tractor 10 has skidded during traveling for the given period of time. Note that one example of the specific period of time is several seconds. In a case where an affirmative determination is made in step S14 (S14: YES), the process of the control device 100 shifts to step S15.

In step S15, the control device 100 refers to a farm field map M corresponding to the weather information WI acquired in step S13. More specifically, when the weather information WI includes information indicating that it is not raining, the control device 100 refers to the first farm field map M1. Meanwhile, when the weather information WI includes information indicating that it is raining, the control device 100 refers to the second farm field map M2. The control device 100 then turns on a skid flag of the divisional section specified in step S12 on the farm field map M referred to by the control device 100. After that, the process of the control device 100 returns to step S10.

In the meantime, in a case where a negative determination is made in step S14 (S14: NO), the process of the control device 100 shifts to step S16. In step S16, the control device 100 refers to a farm field map M corresponding to the weather information WI acquired in step S13, similarly to step S15. Then, the control device 100 turns off a skid flag of the divisional section specified in step S12 on the farm field map M referred to by the control device 100. After that, the process of the control device 100 returns to step S10.

Skid Escape Control

The skid escape control is started on condition that the escape control switch S2 is turned on by the occupant of the electrified tractor 10. That is, the control device 100 executes the skid escape control on condition that the control device 100 acquires a second signal SIG2 from the escape control switch S2. Further, the skid escape control is ended on condition that the escape control switch S2 is turned off by the occupant of the electrified tractor 10. That is, the control device 100 ends the skid escape control on condition that the control device 100 does not acquire the second signal SIG2 from the escape control switch S2.

Figure 4:
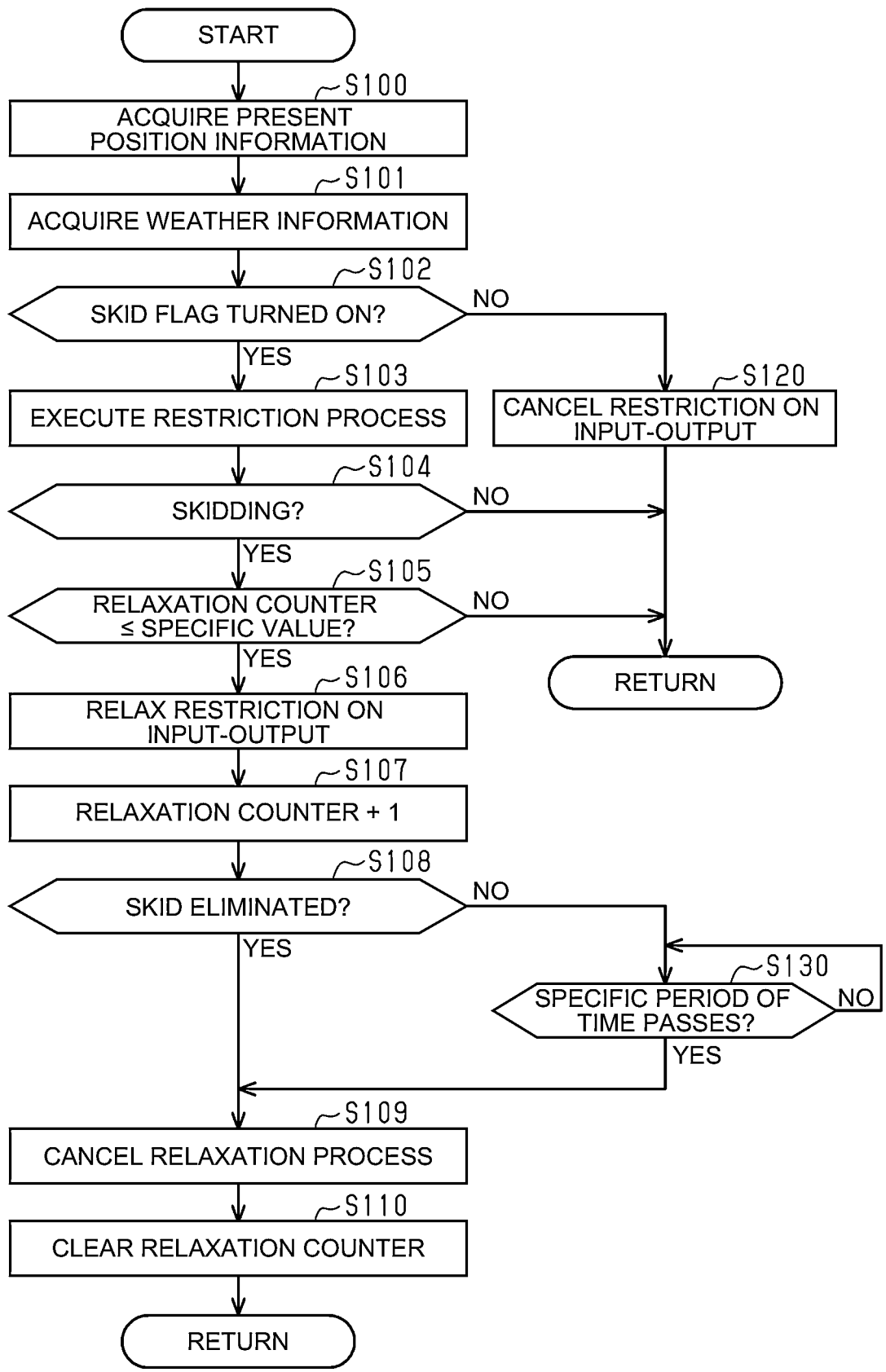
FIG. 4 is a flowchart of a skid escape control to be executed by the control device of the electrified tractor according to the first embodiment.

As illustrated in FIG. 4, when the skid escape control is started, the control device 100 executes the process of step S100. In step S100, the control device 100 acquires present position information PI from the GPS device 50. Then, the control device 100 calculates a present position of the electrified tractor 10 based on the position information PI. After that, the process of the control device 100 shifts to step S101.

In step S101, the control device 100 requests weather information WI corresponding to the present position of the electrified tractor 10 to the weather server via the wireless communicator 51. Then, the control device 100 receives the weather information WI via the wireless communicator 51. The control device 100 determines whether it is raining or not, based on the received weather information WI. After that, the process of the control device 100 shifts to step S102.

In step S102, the control device 100 refers to a farm field map M corresponding to the weather information WI. That is, when the weather information WI includes information indicating that it is not raining, the control device 100 refers to the first farm field map M1. Meanwhile, when the weather information WI includes information indicating that it is raining, the control device 100 refers to the second farm field map M2. Then, the control device 100 specifies a divisional section corresponding to the present position of the electrified tractor 10 on the farm field map M. Further, the control device 100 determines whether a skid flag of the specified divisional section is turned on or off on the farm field map M. When the skid flag is turned on (S102: YES), the process of the control device 100 shifts to step S103.

In step S103, the control device 100 controls the first inverter 71 and the second inverter 72 such that input-output electric power of the battery 77 falls within a specific electric power range determined in advance. Here, the specific electric power range is determined to be narrower than an inputtable-outputtable electric power range determined for normal traveling before the restriction process is executed. For example, the specific electric power range is determined as a range in which no breakage occurs in the battery 77 and its peripheral circuit even when sudden rotation or sudden braking unexpectedly occurs in the wheel 12. Note that the process of step S103 is the restriction process. Further, in a case where the skid flag of the divisional section is turned on the farm field map, the restriction process in step S103 is executed. Accordingly, the divisional section the skid flag of which is turned on is a restriction area. After the restriction process is executed, the process of the control device 100 shifts to step S104.

In step S104, the control device 100 determines whether or not a state where the wheel 12 of the electrified tractor 10 is skidding continues for a specific period of time determined in advance. More specifically, the control device 100 acquires a rotation speed A1 detected by the rotation sensor 61. Meanwhile, the control device 100 specifies a present position based on position information PI detected by the GPS device 50. The control device 100 calculates a distance between a position before a unit time and the present position specified this time as a travel distance of the electrified tractor 10 per unit time, that is, as a traveling speed. The control device 100 determines whether or not a state where a traveling speed calculated based on the rotation sensor 61 is larger than the traveling speed calculated based on the position information PI from the GPS device 50 continues for a specific period of time determined in advance or more. In a case where an affirmative determination is made, the control device 100 determines that the electrified tractor 10 is skidding. One example of the specific period of time is several seconds, and this is the same as the specific period of time in step S13.

Note that, when the state where the electrified tractor 10 is skidding continues for the specific period of time or more even though the wheel 12 is skidding, there is such a probability that the occupant steps on the accelerator pedal of the electrified tractor 10 to try to escape from a section where the skid occurs. Accordingly, the process of step S104 is the determination process of determining whether or not there is a possibility that the electrified tractor 10 moves from the restriction area to outside the restriction area.

In a case where a negative determination is made in step S104 (S104: NO), the series of processes as the skid escape control returns to step S100. In the meantime, in a case where an affirmative determination is made in step S104 (S104: YES), the process of the control device 100 shifts to step S105.

In step S105, the control device 100 determines whether or not a relaxation counter indicates a specific number of times determined in advance or less. The relaxation counter indicates the number of times of execution of the relaxation process (described later). An initial value of the relaxation counter is zero. The specific number of times is determined by experiment or the like as the number of times that does not impose an excessive burden on the battery 77 even if the relaxation process is executed. One example of the specific number of times is two or three times.

In a case where a negative determination is made in step S105 (S105: NO), the series of processes as the skid escape control returns to step S100. In a case where an affirmative determination is made in step S105 (S105: YES), the process of the control device 100 shifts to step S106.

In step S106, the control device 100 expands the specific electric power range set in the restriction process. More specifically, the control device 100 sets the specific electric power range to the same range as an electric power range for normal traveling before the specific electric power range is set. That is, although the control device 100 is in the middle of execution of the restriction process, the control device 100 temporarily relaxes an inputtable-outputtable electric power range of the battery 77 to the same range as the range for normal traveling. That is, the process of step S106 is the relaxation process of expanding the specific electric power range. After that, the process of the control device 100 shifts to step S107.

In step S107, the control device 100 adds one to the relaxation counter. After that, the process of the control device 100 shifts to step S108.

In step S108, the control device 100 determines whether the skid of the wheel 12 is eliminated or not. More specifically, the control device 100 calculates a traveling speed based on the rotation sensor 61, similarly to step S104. Further, the control device 100 calculates a traveling speed based on position information PI from the GPS device 50. Then, when the traveling speed calculated based on the rotation sensor 61 and the traveling speed calculated based on the position information PI from the GPS device 50 both have positive values, and the difference between the traveling speeds is less than a given value, the control device 100 determines that the skid state is eliminated.

In a case where an affirmative determination is made in step S108 (S108: YES), the process of the control device 100 shifts to step S109.

In step S109, the control device 100 cancels the relaxation process. That is, the control device 100 sets the specific electric power range temporarily expanded in the relaxation process to the original specific electric power range determined in advance. More specifically, the control device 100 controls the first inverter 71 and the second inverter 72 such that input-output electric power of the battery 77 falls within the original specific electric power range. Then, the process of the control device 100 shifts to step S110.

In step S110, the control device 100 clears the relaxation counter. Then, the process of the control device 100 returns to step S100. In the meantime, in a case where a negative determination is made in step S108 (S108: NO), the process of the control device 100 shifts to step S130.

In step S130, the control device 100 determines whether or not time passing after the relaxation process is executed in step S106 is larger than a specific period of time determined in advance. One example of the specific period of time is from several seconds to dozens of seconds, or the like. In a case where a negative determination is made in step S130 (S130: NO), the control device 100 executes the process of step S130 again. In a case where an affirmative determination is made in step S130 (S130: YES), the process of the control device 100 shifts to step S109.

In the meantime, in a case where a negative determination is made in step S102 (S102: NO), the process of the control device 100 shifts to step S120.

In step S120, the control device 100 cancels the restriction process. Note that, in a case where the restriction process is not executed at the start of step S120, the control device 100 maintains a present control in terms of the control on the input-output electric power of the battery 77. That is, the control device 100 maintains a state where the restriction process is not executed. After that, the process of the control device 100 returns to step S100.

Operations of First Embodiment

In the first embodiment, assume a case where the electrified tractor 10 is placed in a divisional section the skid flag of which is turned on the farm field map M. In this case, a state where the wheel 12 of the electrified tractor 10 is skidding and a state where the skid is eliminated and the wheel 12 is gripped may be repeated. When the wheel 12 is gripped suddenly from the state where the wheel 12 is skidding, large electric power is supplied from the first electric motor 41 to the battery 77. In the above embodiment, under such a situation, in order to prevent excessive electric power from being supplied to the battery 77, the restriction process is executed such that the input-output electric power of the battery 77 is restricted within the specific electric power range.

In the meantime, in a case where the wheel 12 is skidding in a divisional section the skid flag of which is turned on, it is necessary to transmit a large torque to the wheel 12 that is not skidding in order to escape to outside the divisional section. That is, it is necessary to supply large electric power to the first electric motor 41 from the battery 77.

Effects of First Embodiment (1-1) In the above embodiment, in a case where there is a possibility that the electrified tractor 10 moves to outside a divisional section the skid flag of which is turned on, the restriction on the input-output electric power of the battery 77 is relaxed even during the execution of the restriction process. As a result, electric power necessary for the first electric motor 41 is supplied, so that the electrified tractor 10 is more likely to escape from the divisional section.

(1-2) In the above embodiment, in a case where the relaxation counter exceeds the specific number of times from the start of the restriction process until the end of the restriction process, the execution of the relaxation process is prohibited. Accordingly, it is possible to restrain a state of charge SOC of the battery 77 from decreasing excessively or an excessive burden from being imposed on the battery 77 due to repetition of the relaxation process.

(1-3) In the above embodiment, the control device 100 executes the farm field map creating control. On the farm field map M, a divisional section where the wheel 12 has actually skidded, that is, a section where mud can be present is shown in the form of a skid flag. When the relaxation process is executed in accordance with the farm field map M, it is possible to restrain an output torque of the first electric motor 41 from becoming insufficient at the time of escape from mud where the electrified tractor 10 requires a relatively large torque as an output torque from the first electric motor 41.

(1-4) In the above embodiment, in the determination process, in a case where a state where the wheel 12 is skidding continues for the specific period of time, the control device 100 determines that there is a possibility that the electrified tractor 10 moves from a divisional section the skid flag of which is turned on to outside the divisional section. With this configuration, it is possible to accurately determine that the electrified tractor 10 tries to escape from mud or the like, based on the skid of the wheel 12.

(1-5) The farm field exhibits different muddy states for a case where it is raining and for a case where it is not raining. For example, in a case where it is raining, the farm field has a large muddy degree and includes many muddy parts, as compared with a case where it is not raining. In the above embodiment, the control device 100 can selectively refer to the first farm field map M1 or the second farm field map M2 when the control device 100 executes the restriction process. That is, the control device 100 can execute the restriction process based on a farm field map M that more appropriately represents the actual state of the farm field.

Second Embodiment

The following describes a second embodiment of the electrified tractor and the control program for the electrified tractor. In the second embodiment, the schematic configuration of the electrified tractor 10, the power transmission path in the electrified tractor 10, the electrical configuration of the electrified tractor 10, and the schematic configuration of the control device 100 are the same as those in the first embodiment.

Farm Field Escape Control

The control device 100 executes the farm field escape control. The farm field escape control is started on condition that the electrified tractor 10 is placed inside the farm field. That is, the control device 100 acquires present position information PI on the electrified tractor 10 from the GPS device 50. Further, the control device 100 starts the farm field escape control on condition that a present position of the electrified tractor 10 is placed inside a region shown on the farm field map M based on the position information PI thus acquired. Further, the farm field escape control is ended on condition that the electrified tractor 10 is placed outside the farm field. That is, the control device 100 ends the farm field escape control on condition that the present position of the electrified tractor 10 that is specified by the present position information PI is placed outside the region shown on the farm field map M.

Figure 5:
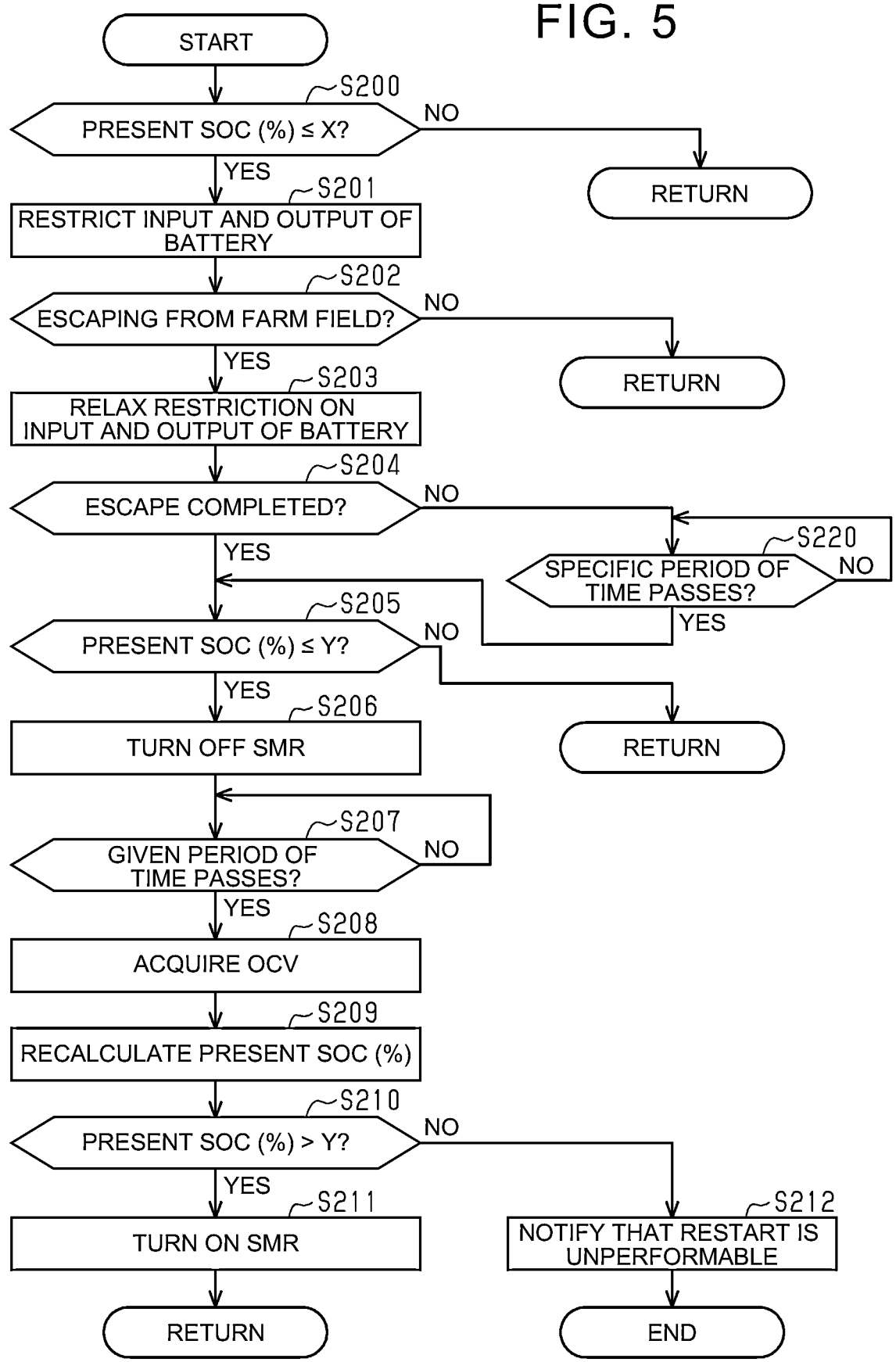
FIG. 5 is a flowchart of a farm field escape control to be executed by a control device of an electrified tractor according to a second embodiment.

As illustrated in FIG. 5, when the farm field escape control is started, the control device 100 executes the process of step S200. In step S200, the control device 100 determines whether or not a present state of charge SOC of the battery 77 is equal to or less than a first specific state of charge X determined in advance. More specifically, the control device 100 acquires battery information BI from the battery 77. Further, the control device 100 acquires a temperature T1 from the battery temperature sensor 62. The control device 100 calculates the present state of charge SOC of the battery 77 based on the battery information BI and the temperature T1. The first specific state of charge X is determined as a lower limit of the state of charge SOC which allows the battery 77 to output electric power necessary for normal traveling of the electrified tractor 10 and which does not cause excessive deterioration of the battery 77.

In a case where a negative determination is made in step S200 (S200: NO), the process of the control device 100 returns to step S200. In a case where an affirmative determination is made in step S200 (S200: YES), the process of the control device 100 shifts to step S201.

In step S201, the control device 100 controls the first inverter 71 and the second inverter 72 such that the input-output electric power of the battery 77 falls within a specific electric power range determined in advance. Here, the specific electric power range is determined to be narrower than an inputtable-outputtable electric power range determined before the restriction process is executed. For example, the specific electric power range is determined as a range where overdischarge does not occur in the battery 77 in a state where the state of charge SOC of the battery 77 is equal to or less than the first specific state of charge X. Note that the process of step S201 is the restriction process. Further, as described above, the series of processes as the farm field escape control including the restriction process of step S201 is executed on condition that the electrified tractor 10 is placed inside the farm field. Accordingly, the farm field is the restriction area. After the restriction process is executed, the process of the control device 100 shifts to step S202.

In step S202, the control device 100 determines whether or not a state where the electrified tractor 10 tries to escape from the farm field continues for a specific period of time determined in advance. More specifically, the control device 100 acquires an acceleration IA from the acceleration sensor 64. Then, the control device 100 calculates an inclination of the vehicle body 13 based on the acceleration IA. Here, the inclination of the vehicle body 13 is an acute angle out of angles formed between the up-down axis of the vehicle body 13 and the vertical axis extending in the gravitational direction. Accordingly, when the electrified tractor 10 travels on a horizontal plane, the inclination of the vehicle body 13 is zero. The control device 100 determines whether or not a state where the inclination of the vehicle body 13 is larger than a specific angle determined in advance continues for a specific period of time determined in advance or more. In a case where an affirmative determination is made, the control device 100 determines that the electrified tractor 10 tries to escape from the farm field. One example of the specific period of time is several seconds. Accordingly, the process of step S202 is the determination process of determining whether or not there is a possibility that the electrified tractor 10 moves from the restriction area to outside the restriction area.

In a case where a negative determination is made in step S202 (S202: NO), the series of processes as the farm field escape control returns to step S200. In the meantime, in a case where an affirmative determination is made in step S202 (S202: YES), the process of the control device 100 shifts to step S203.

In step S203, the control device 100 expands the specific electric power range set in the restriction process. More specifically, the control device 100 sets the specific electric power range to the same range as an electric power range for normal traveling before the specific electric power range is set. That is, although the control device 100 is in the middle of execution of the restriction process, the control device 100 temporarily relaxes an inputtable-outputtable electric power range of the battery 77 to the same range as the range for normal traveling. That is, the process of step S203 is the relaxation process of expanding the specific electric power range. After that, the process of the control device 100 shifts to step S204.

In step S204, the control device 100 determines whether or not the electrified tractor 10 has escaped from the farm field. More specifically, the control device 100 acquires an acceleration IA from the acceleration sensor 64. The control device 100 determines whether or not a state where the inclination of the vehicle body 13 is equal to or less than the specific angle continues for a specific period of time. In a case where an affirmative determination is made, the control device 100 determines that the electrified tractor 10 has escaped from the farm field. One example of the specific period of time is several seconds.

In a case where an affirmative determination is made in step S204 (S204: YES), the process of the control device 100 shifts to step S205. In the meantime, in a case where a negative determination is made in step S204 (S204: NO), the process of the control device 100 shifts to step S220.

In step S220, the control device 100 determines whether or not time passing after the relaxation process is executed in step S203 continues for a specific period of time determined in advance. One example of the specific period of time is from several seconds to dozens of seconds, or the like. In a case where a negative determination is made in step S220 (S220: NO), the control device 100 executes the process of step S220 again. In a case where an affirmative determination is made in step S220 (S220: YES), the process of the control device 100 shifts to step S205.

In step S205, the control device 100 determines whether or not a present state of charge SOC of the battery 77 is equal to or less than a second specific state of charge Y determined in advance. More specifically, the control device 100 acquires battery information BI from the battery 77. Further, the control device 100 acquires a temperature T1 from the battery temperature sensor 62. The control device 100 calculates the present state of charge SOC of the battery 77 based on the battery information BI and the temperature T1. The second specific state of charge Y is determined as a lower limit of the state of charge SOC that does not bring the battery 77 into an overdischarge state. That is, the second specific state of charge Y is a value smaller than the first specific state of charge X.

In a case where a negative determination is made in step S205 (S205: NO), the process of the control device 100 returns to step S200. In a case where an affirmative determination is made in step S205 (S205: YES), the process of the control device 100 shifts to step S206.

In step S206, the control device 100 turns off the system main relay 80. That is, the control device 100 turns off electrical connection between the battery 77 and the converter 85. Note that the process of step S206 is a reset process of turning off the system main relay 80 in a case where the state of charge SOC of the battery 77 is equal to or less than the second specific state of charge Y determined in advance. After that, the process of the control device 100 shifts to step S207.

In step S207, the control device 100 determines whether or not a specific period of time determined in advance has passed after the system main relay 80 is turned off. The specific period of time is set by experiment or the like as a period of time required until an open circuit voltage OCV of the battery 77 becomes stable.

In a case where a negative determination is made in step S207 (S207: NO), the control device 100 executes the process of step S207 again. In a case where an affirmative determination is made in step S207 (S207: YES), the process of the control device 100 shifts to step S208.

In step S208, the control device 100 acquires an open circuit voltage OCV of the battery 77. The process of the control device 100 shifts to step S209. In step S209, the control device 100 calculates a present state of charge SOC of the battery 77 based on the open circuit voltage OCV. That is, the process of step S209 is a recalculation process of recalculating the state of charge SOC of the battery 77 in a state where the system main relay 80 is turned off after the reset process. After that, the process of the control device 100 shifts to step S210.

In step S210, the control device 100 determines whether or not the state of charge SOC of the battery 77 thus recalculated in the recalculation process is larger than the second specific state of charge Y. In a case where an affirmative determination is made in step S210 (S210: YES), the process of the control device 100 shifts to step S211.

In step S211, the control device 100 turns on the system main relay 80. That is, the control device 100 turns on electrical connection between the battery 77 and the converter 85. After that, the process of the control device 100 returns to step S200.

In the meantime, in a case where a negative determination is made in step S210 (S210: NO), the process of the control device 100 shifts to step S212.

In step S212, the control device 100 keeps the system main relay 80 turned off. Then, the control device 100 notifies the occupant of the electrified tractor 10 that the power supply circuit 99 of the electrified tractor 10 cannot be restarted. As one example of the notification, the control device 100 turns on an in-vehicle indicator lamp or the like that uses a battery different from the battery 77 as a drive source. After that, the series of processes as the farm field escape control is ended. Note that, in a case where the series of processes as the farm field escape control is ended through step S212, the system main relay 80 remains off, so that the control device 100 cannot execute a normal control on the electrified tractor 10. Accordingly, it is necessary to charge the battery 77 of the electrified tractor 10 by an external power source or the like.

Operations of Second Embodiment

In the second embodiment, assume a case where the electrified tractor 10 is placed inside the farm field, and the state of charge SOC of the battery 77 is equal to or less than the first specific state of charge X. In this case, when the electrified tractor 10 travels at high speed or when a load to the work machine 20 is large, the state of charge SOC of the battery 77 might become lower than the second specific state of charge Y, and overdischarge might occur. In view of this, in the second embodiment, in a case where the state of charge SOC of the battery 77 is equal to or less than the first specific state of charge X, the input-output electric power of the battery 77 is restricted within the specific electric power range.

In the meantime, when the electrified tractor 10 moves from the farm field to outside the farm field, the electrified tractor 10 often climbs a slope or a step. Accordingly, in order that the electrified tractor 10 escapes from the farm field, it is necessary to transmit a large torque to the wheels 12. That is, it is necessary to supply large electric power to the first electric motor 41 from the battery 77.

Effects of Second Embodiment

Next will be described effects of the second embodiment. The electrified tractor 10 and the control program for the electrified tractor 10 according to the second embodiment yield the following effects in addition to the effect (1-5) of the first embodiment.

(2-1) In the above embodiment, the control device 100 executes the restriction process on condition that the state of charge SOC of the battery 77 is equal to or less than the first specific state of charge X. With the above configuration, it is possible to restrict input and output of electric power of the battery 77 along with a decrease in the state of charge SOC of the battery 77. Accordingly, it is possible to restrain the battery 77 from overdischarging.

(2-2) In the above embodiment, in a case where there is a possibility that the electrified tractor 10 moves to outside the farm field, the restriction on the input-output electric power of the battery 77 is relaxed even during the execution of the restriction process. Accordingly, at the time when the electrified tractor 10 escapes from the farm field, it is possible to restrain an output torque of the first electric motor 41 from becoming insufficient. As a result, it is possible to restrain such a situation that, even though the state of charge SOC that allows the electrified tractor 10 to escape from the farm field remains as the state of charge SOC of the battery 77, the electrified tractor 10 cannot escape from the farm field due to the restriction process being executed.

(2-3) In the above embodiment, the electrified tractor 10 determines whether or not there is a possibility that the electrified tractor 10 moves from the farm field to outside the farm field, based on a detection result on the acceleration IA detected by the acceleration sensor 64. With the above configuration, the control device 100 can accurately determine that the electrified tractor 10 tries to escape from the farm field to a road or the like by traveling on a slope, based on the acceleration sensor 64.

(2-4) When the relaxation process is executed, the battery 77 can output much electric power temporarily. Accordingly, the state of charge SOC to be calculated may be calculated as a value smaller than an original state of charge SOC. Accordingly, even though the original state of charge SOC is larger than the second specific state of charge Y, the control device 100 may mistakenly determine that the state of charge SOC is equal to or less than the second specific state of charge Y When such a false determination is made, the traveling of the electrified tractor 10 is prohibited even through the electrified tractor 10 can still travel actually.

In the above embodiment, the control device 100 executes the reset process and the recalculation process after the relaxation process. Further, in a case where the state of charge SOC recalculated in the recalculation process is larger than the second specific state of charge Y, the control device 100 turns on the system main relay 80.

As such, after the relaxation process, the battery 77 is electrically separated from the first inverter 71 by the reset process, so that the open circuit voltage OCV of the battery 77 is stable. Then, the state of charge SOC is calculated based on the open circuit voltage OCV that is in a stable state, so that the false determination is hardly made.

Modifications

The embodiments can also be carried out by adding changes as stated below. The embodiments and the following modifications can be carried out in combination as long as they do not cause any technical inconsistencies.

In the above embodiments, the restriction area is not limited to a farm field and a divisional section the skid flag of which is turned on. An area where it is effective for the electrified tractor 10 to travel in a state where input-output electric power is restricted should be determined as the restriction area.

In the above embodiments, a condition to execute the restriction process should include at least a condition that the electrified tractor 10 travels inside the restriction area. That is, the restriction process may be executed when one or more other conditions are satisfied in addition to the condition that the electrified tractor 10 travels inside the restriction area.

In the above embodiments, the determination on the skid state is not limited to the example of the embodiment. The control device 100 may determine that the electrified tractor 10 is in the skid state, on condition that a state where the traveling speed of the electrified tractor 10 that is calculated based on the rotation speed A1 detected by the rotation sensor 61 is equal to or less than a predetermined traveling speed and the operation amount ACCP of the accelerator pedal that is detected by the accelerator pedal sensor 65 is equal to or more than a predetermined amount continues for a specific period of time.

In the above embodiments, the control device 100 may include a map other than the first farm field map M1 and the second farm field map M2. For example, the control device 100 may include a map for snow fall. Further, the control device 100 may include different farm field maps M for respective seasons. Further, the control device 100 may include a single farm field map M. In a case where the control device 100 includes a single farm field map M, the process for acquisition of weather information WI can be omitted.

In the above embodiments, the control device 100 may execute the determination process by a process different from that in the above embodiment. For example, the electrified tractor 10 may include a switch that can be switched between ON and OFF, separately from the map switch S1 and the escape control switch S2, and when the switch is operated, the control device 100 may make an affirmative determination in the determination process.

In the first embodiment, the control device 100 may omit the processes related to the relaxation counter. That is, the control device 100 may omit the processes of step S105, step S107, step S110.

In the relaxation process of the above embodiments, the specific electric power range may not be set to the same range as the electric power range for normal traveling before the specific electric power range is set. That is, in the relaxation process, a range wider than the specific electric power range set in the restriction process should be achieved.

In the second embodiment, the control device 100 may omit the processes after step S206. That is, in a case where the state of charge SOC of the battery 77 is equal to or less than the second specific state of charge Y after the execution of the relaxation process, the control device 100 may prohibit the traveling of the electrified tractor 10.

In the second embodiment, the processes related to the relaxation counter in the first embodiment may be applied. More specifically, the control device 100 may increase the relaxation counter after the process of step S203, and in a case where the relaxation counter is equal to or more than a specific value, the subsequent relaxation process may be prohibited.

What is claimed is:

1. An electrified tractor, comprising:
a vehicle body connectable to a work machine;
an electric motor;
a battery in which electric power to be supplied to the electric motor is stored;
an inverter configured to control input-output electric power of the battery;
a wheel for traveling, the wheel being configured to rotate by a driving force from the electric motor; and
a control device configured to control the inverter as a target to be controlled, wherein the control device executes the following processes:
a restriction process of, on condition that the electrified tractor travels inside a restriction area determined in advance as one condition, controlling the inverter such that the input-output electric power of the battery falls within a specific electric power range determined in advance;
a determination process of determining whether or not there is a possibility that the electrified tractor moves from the restriction area to outside the restriction area; and
a relaxation process of, in a case where an affirmative determination is made in the determination process during the restriction process, expanding the specific electric power range as compared with a case where a negative determination is made in the determination process, wherein
in a case where the number of times the affirmative determination is made in the determination process exceeds a specific number of times determined in advance after the restriction process is started but before the restriction process is ended, the control device prohibits execution of the relaxation process.

2. The electrified tractor according to claim 1, wherein:
a farm field map is stored in the control device, the farm field map being a map in which a farm field is divided into a plurality of divisional sections, and a position of each of the plurality of divisional sections is associated with skid information indicative of whether the wheel skids or not in the each of the plurality of divisional sections; and
the restriction area is a divisional section, among the plurality of divisional sections, associated with information indicating that the wheel skids on the farm field map.

3. The electrified tractor according to claim 1, further comprising a switch configured to be switched between ON and OFF by an occupant of the electrified tractor, wherein, in the determination process, in a case where the switch is turned on, the control device determines that there is a possibility that the electrified tractor moves from the restriction area to outside the restriction area.

4. The electrified tractor according to claim 1, wherein, in the determination process, in a case where a state where the wheel is skidding continues for a specific period of time determined in advance, the control device determines that there is a possibility that the electrified tractor moves from the restriction area to outside the restriction area.

5. The electrified tractor according to claim 1, wherein the control device executes the restriction process further on condition that a state of charge of the battery is equal to or less than a first specific state of charge determined in advance.

6. The electrified tractor according to claim 5, further comprising an inclination sensor configured to detect an inclination of the vehicle body, wherein:
the restriction area is a farm field; and
in the determination process, the control device determines, based on a detection result from the inclination sensor, whether or not there is a possibility that the electrified tractor moves from the restriction area to outside the restriction area.

7. The electrified tractor according to claim 1, further comprising a system main relay placed between the battery and the inverter, the system main relay being configured to switch electrical conduction between ON and OFF, wherein:
in a case where a state of charge of the battery is equal to or less than a second specific state of charge determined in advance after the relaxation process is executed, the control device executes a reset process and a recalculation process after the reset process, the reset process being a process of turning off the system main relay, the recalculation process being a process of recalculating the state of charge of the battery in a state where the system main relay is turned off; and
in a case where the state of charge of the battery recalculated in the recalculation process is larger than the second specific state of charge, the control device turns on the system main relay.

8. A computer-readable medium storing a control program applied to a control device of an electrified tractor including a vehicle body connectable to a work machine, an electric motor, a battery in which electric power to be supplied to the electric motor is stored, an inverter configured to control input-output electric power of the battery, a wheel for traveling, the wheel being configured to rotate by a driving force from the electric motor, and the control device configured to control the inverter as a target to be controlled, the control program causing the control device to execute the following processes:
- a restriction process of, on condition that the electrified tractor travels inside a restriction area determined in advance as one condition, controlling the inverter such that the input-output electric power of the battery falls within a specific electric power range determined in advance;
- a determination process of determining whether or not there is a possibility that the electrified tractor moves from the restriction area to outside the restriction area; and
- a relaxation process of, in a case where an affirmative determination is made in the determination process during the restriction process, expanding the specific electric power range as compared with a case where a negative determination is made in the determination process, wherein
- in a case where the number of times the affirmative determination is made in the determination process exceeds a specific number of times determined in advance after the restriction process is started but before the restriction process is ended, the execution of the relaxation process is prohibited.

* * * * *